(12) United States Patent
Kim

(10) Patent No.: US 7,607,812 B2
(45) Date of Patent: Oct. 27, 2009

(54) LIGHT-EMITTING DIODE PANEL FIXTURE

(76) Inventor: Steven Kim, 1 Grand Ave. South #604, Palisades Park, NJ (US) 07650

( * ) Notice: Subject to any disclaimer, the term of this patent is extended or adjusted under 35 U.S.C. 154(b) by 252 days.

(21) Appl. No.: 11/797,581

(22) Filed: May 4, 2007

(65) Prior Publication Data

US 2007/0258263 A1 Nov. 8, 2007

Related U.S. Application Data

(60) Provisional application No. 60/797,677, filed on May 5, 2006.

(51) Int. Cl.
*F21V 7/04* (2006.01)

(52) U.S. Cl. ........................ 362/602; 362/606; 362/612; 362/633

(58) Field of Classification Search .................. 362/612, 362/497, 602–605, 802, 26, 27, 630–634, 362/606, 607, 559–561, 249.02, 235, 240
See application file for complete search history.

(56) References Cited

U.S. PATENT DOCUMENTS

| 2,128,679 | A  | * | 8/1938 | Kielian ........................ 362/497 |
| 2003/0128549 | A1 | * | 7/2003 | Matsuura et al. ............ 362/497 |
| 2006/0262554 | A1 | * | 11/2006 | Mok et al. .................. 362/555 |
| 2007/0139961 | A1 | * | 6/2007 | Cheah et al. ................ 362/612 |

* cited by examiner

*Primary Examiner*—Bao Q Truong
(74) *Attorney, Agent, or Firm*—Holland & Knight LLP

(57) ABSTRACT

A light-emitting diode panel fixture including a light guide panel, a light-emitting diode strip at an edge of the light guide panel, a base encompassing the light-emitting diode strip and attached to the light guide panel, and a trim attached to the base.

13 Claims, 8 Drawing Sheets

LIGHT-EMITTING DIODE PANEL FIXTURE

This invention claims the benefit of U.S. Provisional Application No. 60/797,677 filed on May 5, 2006, which is hereby incorporated by reference in its entirety.

BACKGROUND OF THE INVENTION

1. Field of the Invention

Embodiments of the invention relate to lighting, and more particularly, to a light-emitting diode panel fixture. Although embodiments of the invention are suitable for a wide scope of applications, it is particularly suitable for the wide emission of low-intensity light.

2. Discussion of the Related Art

In general, lighting fixtures are either point light sources, such as incandescent bulbs, or linear light sources, such as fluorescent light tubes. Point light sources are typically shaded or directed in such way so as not to be directly in the line of sight for an individual since the high intensity of point light sources can cause discomfort. Point light sources usually emit light at a relatively high-intensity so as to be able to provide a sufficient lighting. Linear light sources can be less intense but yet emit sufficient lighting because the light emits all along the length of the linear light source. Although not as intense, linear light sources are typically diffused or shielded in such way so as not to cause discomfort. The diffusers of most linear light sources are configured to emulate a planar light source by widely diffusing a source light into a lower intensity light across a plane.

Lighting schemes are implemented by using lamps or lighting fixtures mounted on the ceiling, walls or furniture. Typically, ceiling light fixtures and wall light fixtures are used for room lighting, and furniture lighting fixtures and lamps are used for area lighting. However, there are other types of ceiling lighting fixtures and wall light fixtures that can also be used for accent lighting for an area of the room along with other ceiling lighting fixtures or wall light fixtures that are providing room lighting.

Light architects try to light rooms such that a light source or light sources will provide sufficient light to the entire room such that areas of the room are not too bright or not too dark for the intended use of the room. Further, the light sources should not cause any discomfort in the nominal viewing directions within the room. Furthermore, light architects will try to use light fixtures that complement or fit in with the décor of the room. Rooms are usually designed with such concerns in mind such that the room is constructed with the appropriate openings and wiring boxes in the ceilings and/or the walls for light fixtures. However, décors change and the intended use for room changes as well as the fact that some rooms were always poorly lit and/or have lighting that is too intense. Thus, lighting fixtures that do not require major reconstruction or rewiring that can provide comfortable light while fitting into the décor of the room are desirable.

SUMMARY OF THE INVENTION

Accordingly, embodiments of the invention are directed to a light-emitting diode panel fixture that substantially obviates one or more of the problems due to limitations and disadvantages of the related art.

An object of embodiments of the invention is to provide a lighting fixture that can be used as comfortable room lighting.

Another object of embodiments of the invention is to provide a lighting fixture that is a part of the décor of the room.

Another object of embodiments of the invention is to provide a lighting fixture that can be easily retrofitted into room.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a light-emitting diode panel fixture includes a light guide panel, a light-emitting diode strip at an edge of the light guide panel, a base encompassing the light-emitting diode strip and attached to the light guide panel, and a trim attached to the base.

In another aspect, a light-emitting diode panel fixture includes a light guide panel, a light-emitting diode strip at an edge of the light guide panel, a base encompassing the light-emitting diode strip and attached to the light guide panel such that a top edge of the light guide panel is within the base, and a back mirror on the light guide panel.

In yet another aspect, a light-emitting diode panel fixture includes a light guide panel, a light-emitting diode strip at an edge of the light guide panel, and a base encompassing the light-emitting diode strip and attached to the light guide panel, wherein the base is a heat conductive material and has a lip protruding from the base above and out away from the panel assembly to dissipate heat away from the light-emitting diode strip.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings:

FIG. 1b is an assembled view of the light-emitting diode panel fixture shown in FIG. 1a;

DETAILED DESCRIPTION OF THE PREFERRED EMBODIMENTS

Figure 1A:
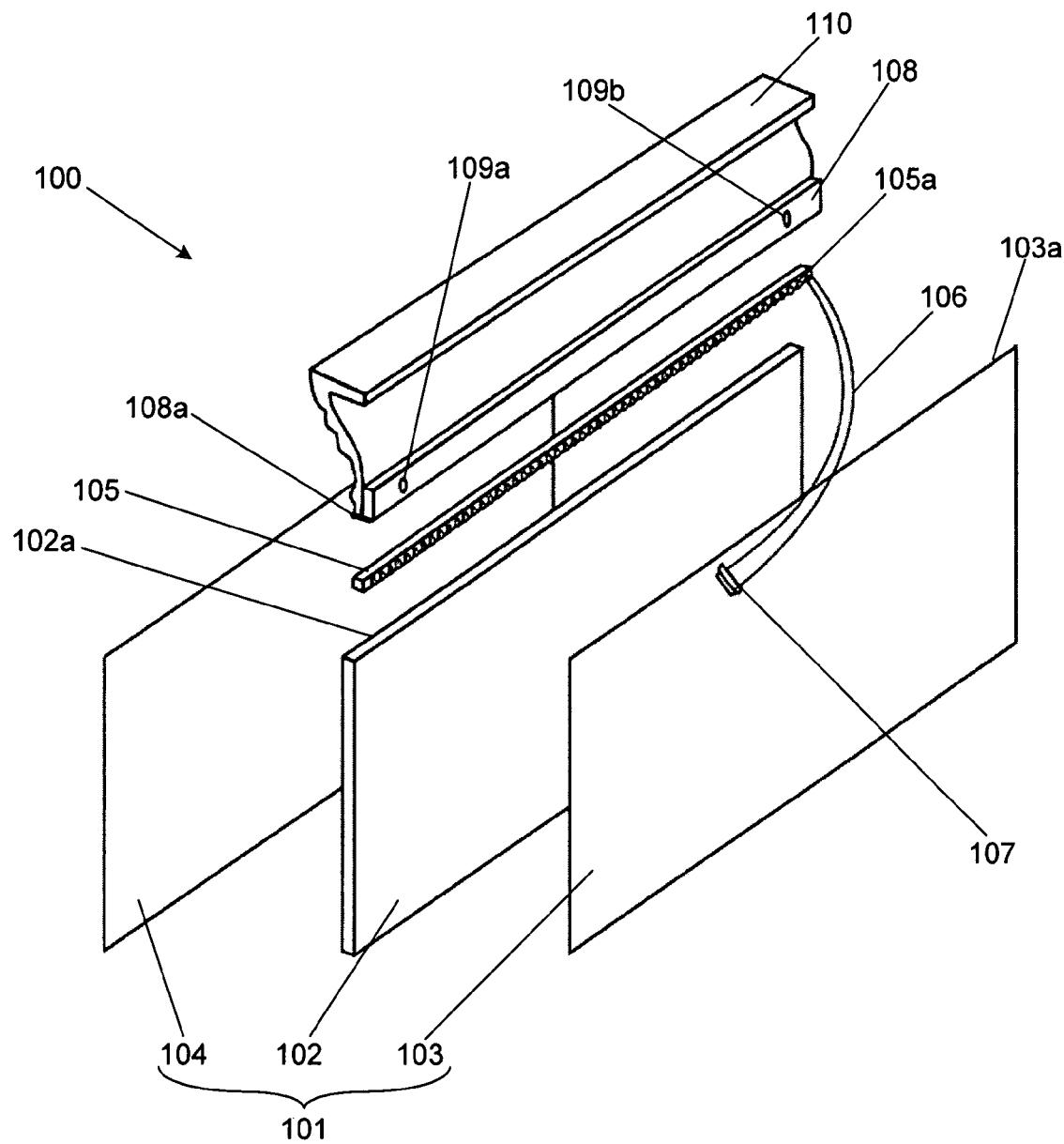
FIG. 1a is an exploded view of a light-emitting diode panel fixture having trim according to an embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 1B:
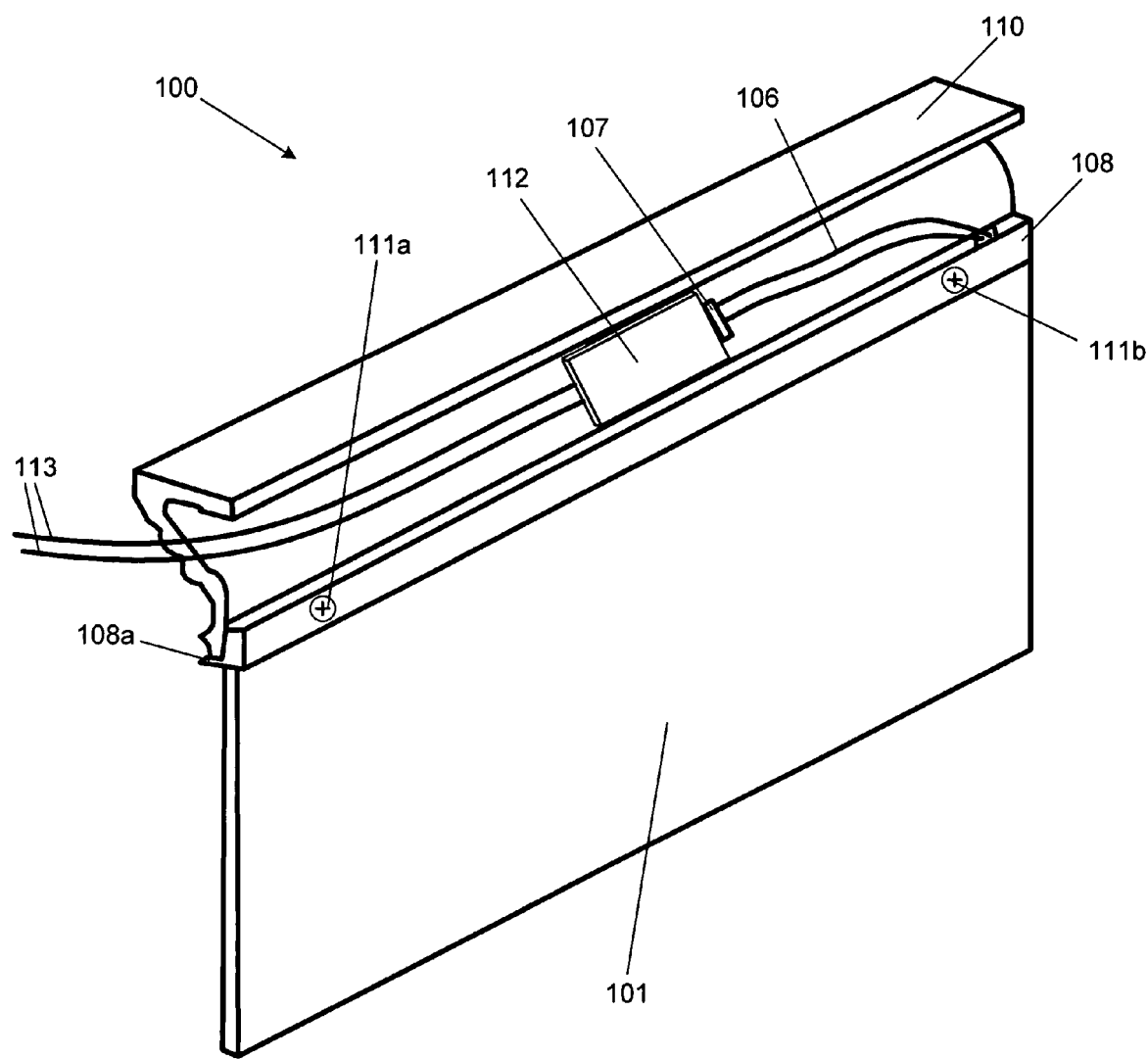

FIG. 1a is an exploded view of a light-emitting diode panel fixture having trim according to an embodiment of the invention. FIG. 1b is an assembled view of the light-emitting diode panel fixture shown in FIG. 1a. As shown in FIG. 1a, a light-emitting diode panel fixture 100 includes a panel assembly 101, a light-emitting diode (LED) strip 105, a base 108 and a decorative trim 110. The panel assembly 101 has a light guide panel 102, a back mirror 103, and a front diffusion cover 104. The light guide panel 102 receives light from the LED strip 105 at a top edge 102a of the light guide panel 102 and disperses the light across the light guide panel 102 into a lower intensity light that is then emitted from the light guide panel 102 through the front diffusion cover 104. The back mirror 103 reflects light from the light guide panel 102 back through the light guide panel 102 toward the front diffusion cover 104.

The LED strip 105 includes a plurality of light-emitting diodes 105a along the length of the LED strip 105. The light-emitting diodes 105a can be one of white light-emitting diodes, blue light-emitting diodes, ultraviolet light-emitting diodes, and a combination of red, green and blue light-emitting diodes. If the light-emitting diodes 105a are either blue light-emitting diodes or ultraviolet light-emitting diodes, the panel assembly 101 is configured to change the blue light or ultraviolet light into visible light. Examples of such configurations include a visible light conversion film between the LED strip 105 and the top edge 102a of the a light guide panel 102, a visible light conversion film between the light guide panel 102 and the front diffusion cover 104, and the light guide panel 102 itself can have a visible light conversion capability. Power is provided to the LED strip 105 through wires 106 attached to a connector 107.

The base 108 receives the LED strip 105 within the base 108 such that internal surfaces of the base 108 act as a reflector that reflects light from the light-emitting diodes 105a toward the top edge 102a of the light guide panel 102. Further, the base 108 receives the top edge 102a of the light guide panel 102. As shown in FIG. 1b, attachment mechanisms 111a and 111b, such as screws, are inserted into the holes 109a and 109b (both shown 1 FIG. 1a) to attach the base 108 to the light guide panel 102. Thus, the base 108 encompasses the LED strip 105 and also retains the light guide panel 102 in place with respect to the LED strip 105. Portions of the back mirror 103 and a front diffusion cover 104 can also be within the base 108, or one of or both the back mirror 103 and the front diffusion cover 104 can be positioned on the light guide panel 102 after the light guide panel 102 is mounted. For example, both the top edge 103a of the back mirror 103 and the top edge 102a of the light guide panel 102 can be within the base 108 while the front diffusion cover 104 is on the light guide panel 102 outside of the base 108.

The base 108 is made of a heat conductive material, such as a metal, to conduct heat generated by the light-emitting diodes 105a away from the light-emitting diodes 105a. As shown in FIG. 1b, a lip 108a protrudes from the base 108 above and out away from the panel assembly 101. The lip 108a aids in dissipating heat away from the light-emitting diodes 105a of the light-emitting diode strip 105.

As shown in FIG. 1b, the decorative trim 110 is attached to the base 108 so as to be on top of the lip 108a of the base 108. The decorative trim 110 can be attached to the base 108 with an adhesive. The decorative trim 110 can be made of wood, cellulose, fiberglass or a composite material. A hollow area within the decorative trim 110 can house a power converter 112 the converts AC voltage of power supply wires 113 to DC voltage. The connector 107 of the LED strip 105 is connected to the power converter 112. Further, the hollow area within the decorative trim 110 can serve as wiring channel for the power supply wires 113 or the wires 106 of other light-emitting diode panel fixtures (not shown) connected to the power converter 112 when the light-emitting diode panel fixture 100 is mounted on a wall or ceiling.

Since the decorative trim is attached to the base 108, the light-emitting diode panel fixture 100 can be mounted on a ceiling or wall with finishing nails through the decorative trim 110. In the alternative, the decorative trim 110 and the base 108 of the light-emitting diode panel fixture 100 can be adhesively attached to a ceiling and/or a wall. Thus, the light-emitting diode panel fixture 100 shown in FIG. 1b can be installed similar to that molding is typically installed. Because the light-emitting diode panel fixture of embodiments of the invention are surface mounted, such as molding, and inherently have their own wiring channel, the light-emitting diode panel fixture of embodiments of the invention to be easily retrofitted to an existing room.

Figure 2:
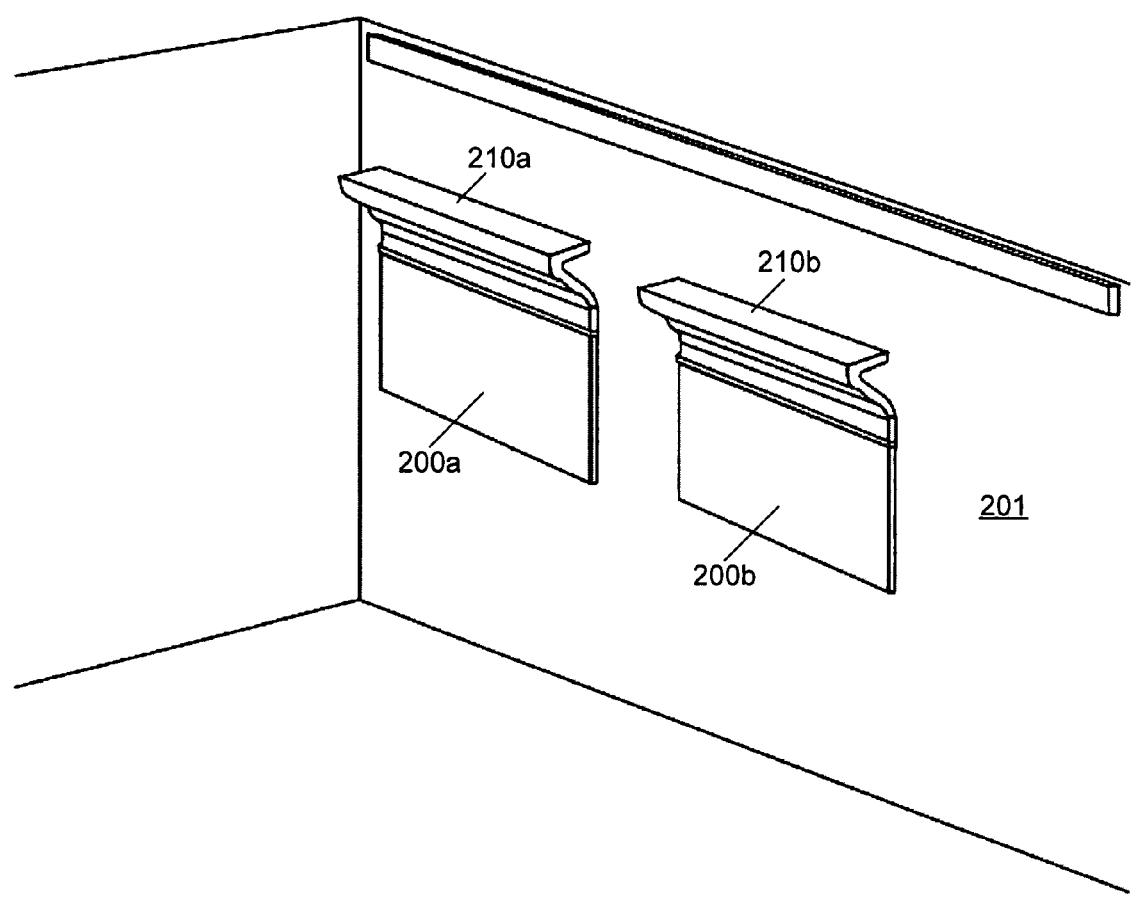
FIG. 2 is a plan view showing a pair of separated light-emitting diode panel fixtures on a wall.
Figure 3:
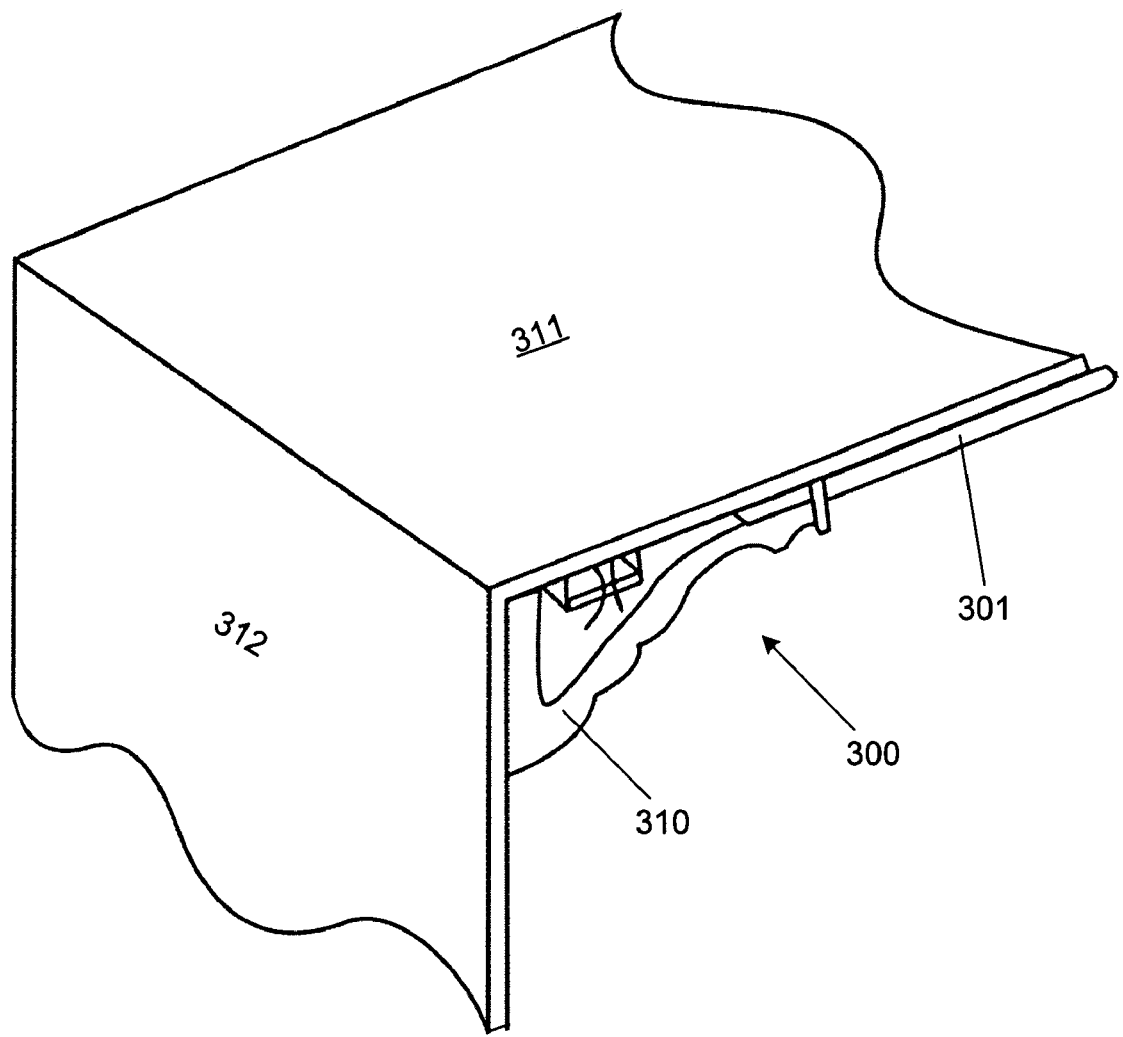
FIG. 3 is a cross-sectional view showing a light-emitting diode panel fixture on a ceiling.

FIG. 2 is a plan view showing a pair of separated light-emitting diode panel fixtures on a wall. As shown in FIG. 2, light-emitting diode panel fixtures 200a and 200b are hung on wall 201. The tops of the decorative trims 210a and 210 of the light-emitting diode panel fixtures 200a and 200b can serve as shelves;

FIG. 3 is a cross-sectional view showing a light-emitting diode panel fixture on a ceiling. As shown in FIG. 2, a light-emitting diode panel fixtures 300 can be mounted at the intersection of a ceiling 311 and a wall 312. In such arrangement, the decorative trim 310 of the light-emitting diode panel fixtures 300 has the appearance of being crown molding and the panel assembly 301 of the light-emitting diode panel fixtures 300 lies along the ceiling 311. In the alternative, the panel assembly 301 of the light-emitting diode panel fixtures 300 can lie along the wall 312 while the decorative trim 310 of the light-emitting diode panel fixtures 300 still has the appearance of being a crown molding. As shown in FIG. 3, the hollowed out area within the decorative trim 310 can serve as wiring channel when the light-emitting diode panel fixture 300 is mounted on the ceiling.

Figure 4:
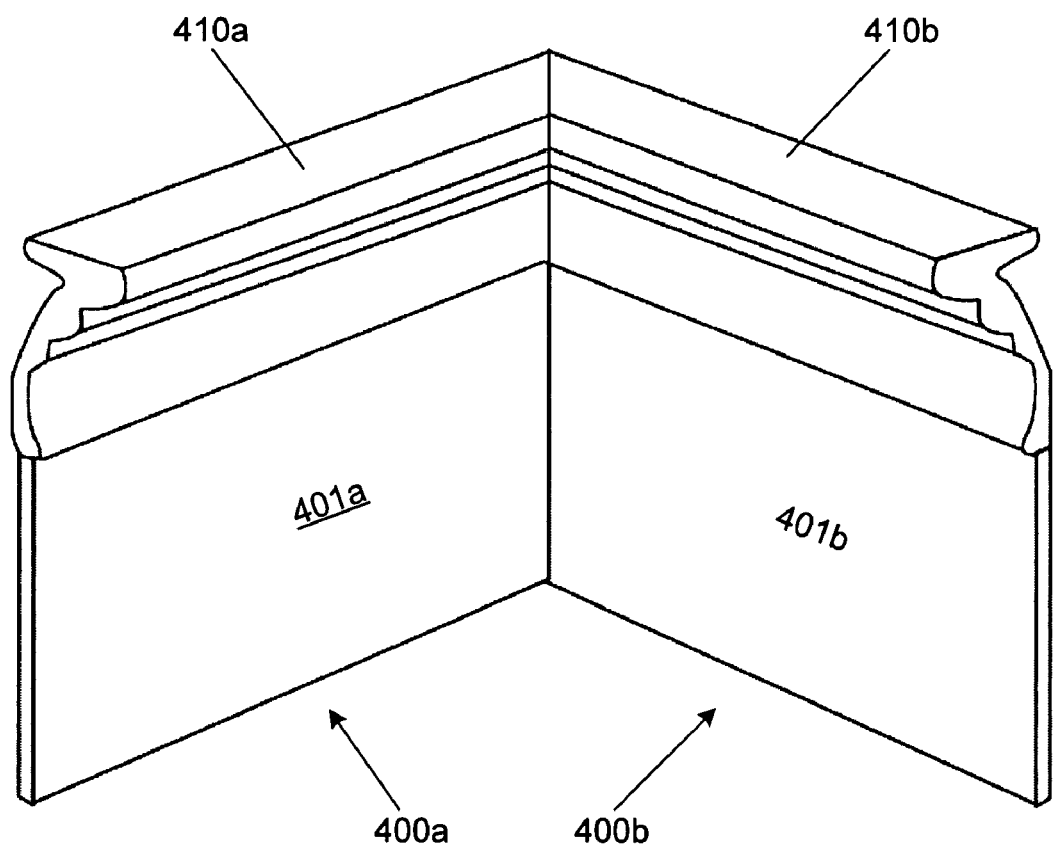
FIG. 4 is a perspective view of a pair of abutting light-emitting diode panel fixtures at a corner of two walls.

FIG. 4 is a perspective view of a pair of abutting light-emitting diode panel fixtures at a corner of two walls. As shown in FIG. 4, ends of decorative trims 410a and 410b can be coped such that the panel assemblies 401a and 401b of two light light-emitting diode panel fixtures 410a and 410b can intersect at the corner of a room. Further, the coped joining of the ends of the decorative trims 410a and 410b allows for continuation of a wiring channel within the hollowed out areas of the decorative trims 410a and 410b about a perimeter of a room when several panel assemblies are used about the perimeter of the room.

Figure 5:
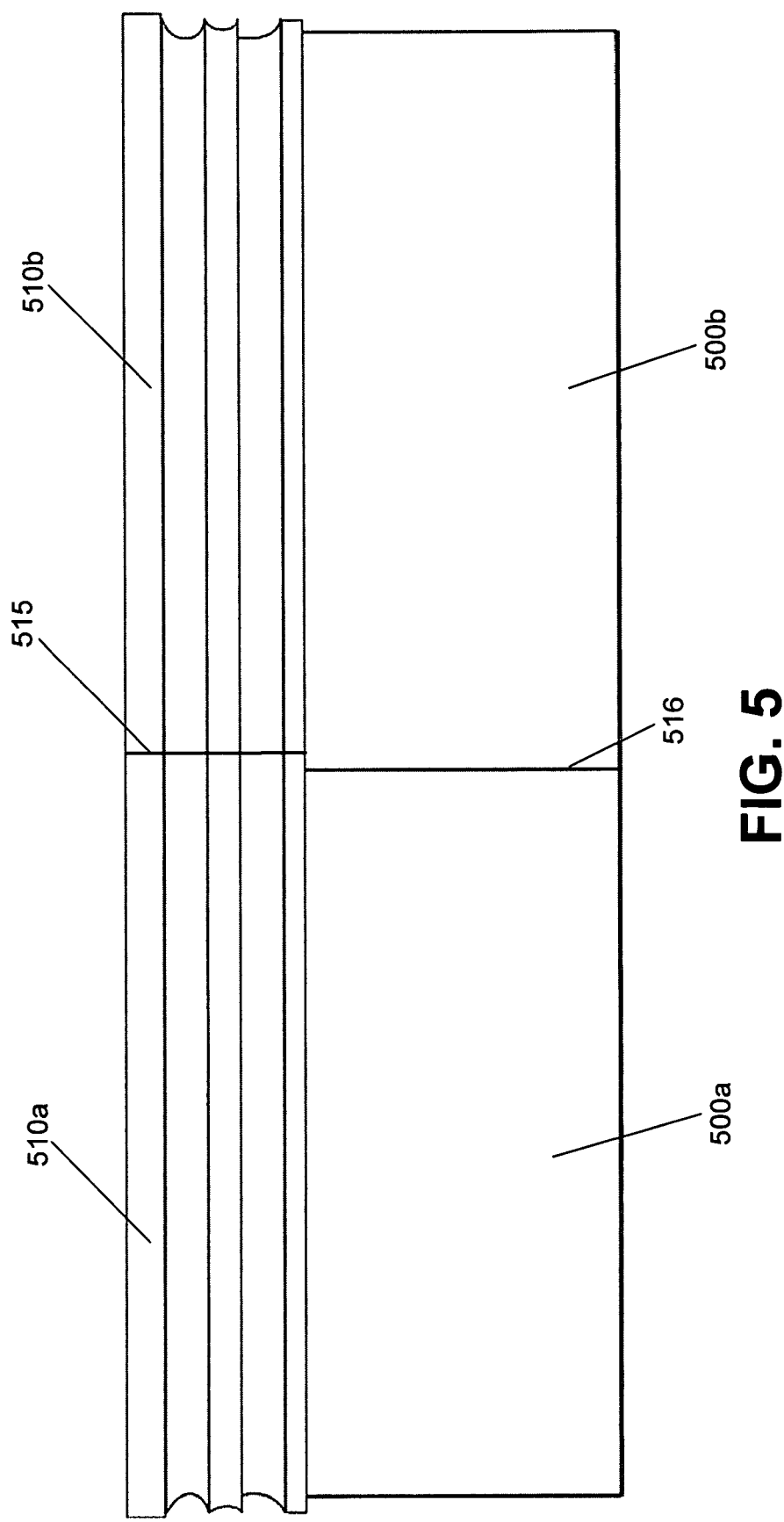
FIG. 5 is a plan view showing a pair of abutting light-emitting diode panel fixtures on a wall or ceiling.

FIG. 5 is a plan view showing a pair of abutting light-emitting diode panel fixtures on a wall or ceiling. As shown in FIG. 5, two light-emitting diode panel fixtures 500a and 500b abut each other. However, the trim joint 515 between the decorative trims 510a and 510b of the light-emitting diode panel fixtures 500a and 500b is offset from a panel joint 516 between the panel assemblies 501a and 501b of the light-emitting diode panel fixtures 500a and 500b. The trim joint 515 is offset from the panel joint because the front diffusion cover of the second light-emitting diode panel fixture 500b overlap the light guide plate of the second light-emitting diode panel fixture 500b. Such an overlap provides the appearance of seamlessness between the two panel assemblies 501a and 501b when the light-emitting diode panel fixtures 500a and 500b are tuned on.

Figure 6:
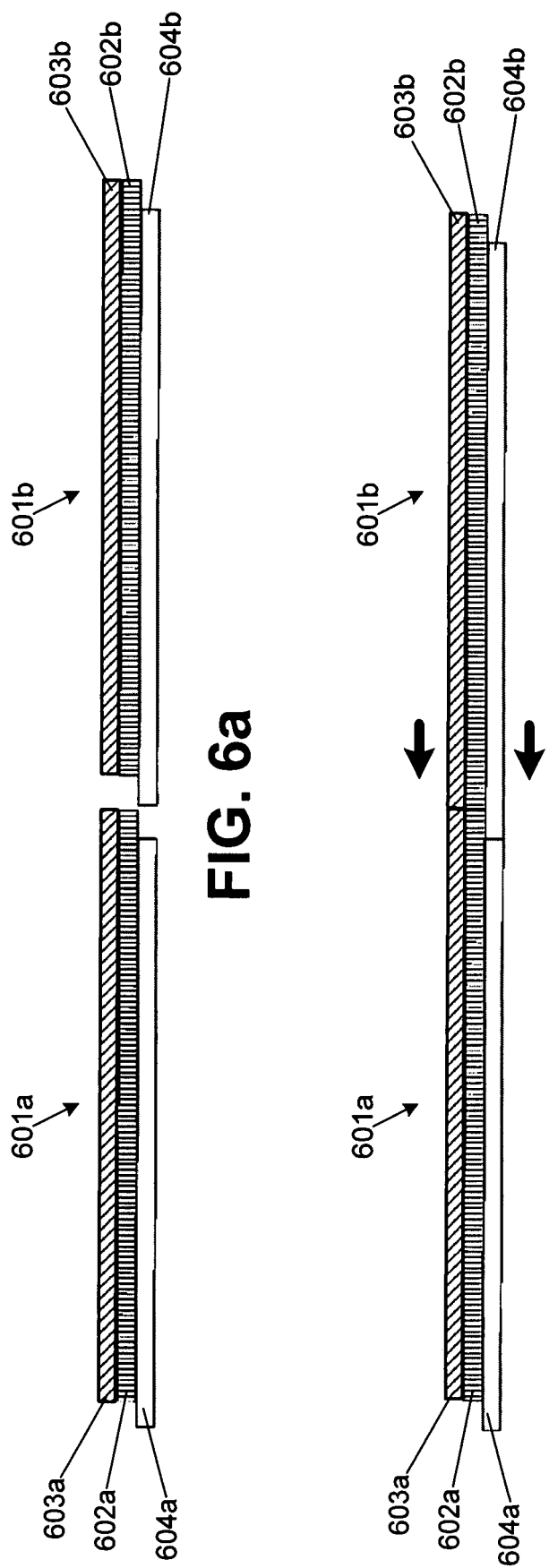
FIGS. 6a and 6b are cross-sectional views showing how two panel assemblies can be abutted such that the joint between the panel assemblies appears seamless.

FIGS. 6a and 6b are cross-sectional views showing how two panel assemblies can be abutted such that a joint between the panel assemblies appears seamless. As shown in FIG. 6a, a first panel assembly 601 is next to a second panel assembly 601b. The first panel assembly 601a has a first back mirror cover 603a, a first light guide panel 602a on the first back mirror cover 603a, and a front diffusion cover 604a on the first light guide panel 602a. The second panel assembly 601b has a first back mirror cover 603b, a first light guide panel 602b on the first back mirror cover 603b, and a front diffusion cover 604b on the first light guide panel 602b. Both the first and second front diffusion covers 604a and 604b are offset from the first and second light guide panels 602a and 602b on which they are respectively residing. Thus, both the first and second front diffusion covers 604a and 604b overhang first sides of the first and second light guide panels 602a and 602b and do not overlap portions of the first and second light guide panels 602a and 602b along second sides opposite to the first sides of the first and second light guide panels 602a and 602b so as to leave non-overlapped portions of the first and second light guide panels 602a and 602b exposed along the second sides of the first and second light guide panels 602a and 602b.

As shown in FIG. 6b, when the second panel assembly 601b is joined to the first panel assembly 601a, the second diffusion cover 604b of the second panel assembly 601b overlaps the first light guide panel 602a of the first panel assembly 601a. Further, the second diffusion cover 604b of the second panel assembly 601b abuts the first diffusion cover 604a of the first panel assembly 601a. The second diffusion cover 604b overlapping the first light guide panel 602a and abutting the first diffusion cover 604a provides the appearance of seamlessness between the first and second panel assemblies 601a and 601b when the first and second panel assemblies 601a and 601b are illuminated.

The panel assemblies shown in FIGS. 6a and 6b are transitional from one panel assembly to the next in terms of maintaining a seamless appearance across a series of panel assemblies. However, ending panel assemblies can be used at the ends of such a series of panel assemblies to maintain a uniform appearance. For example, one end panel assembly can have a front diffusion cover that overhangs a first side but yet still completely covers the light guide plate on which it resides, while another end panel assembly does not have an overhang at a first side but yet has a front diffusion cover that does not cover a portion of the guide plate on which it resides along a second side of the light guide plate on which it resides because the front diffusion cover is offset from the light guide plate at the second side of the light guide plate.

Figure 7:
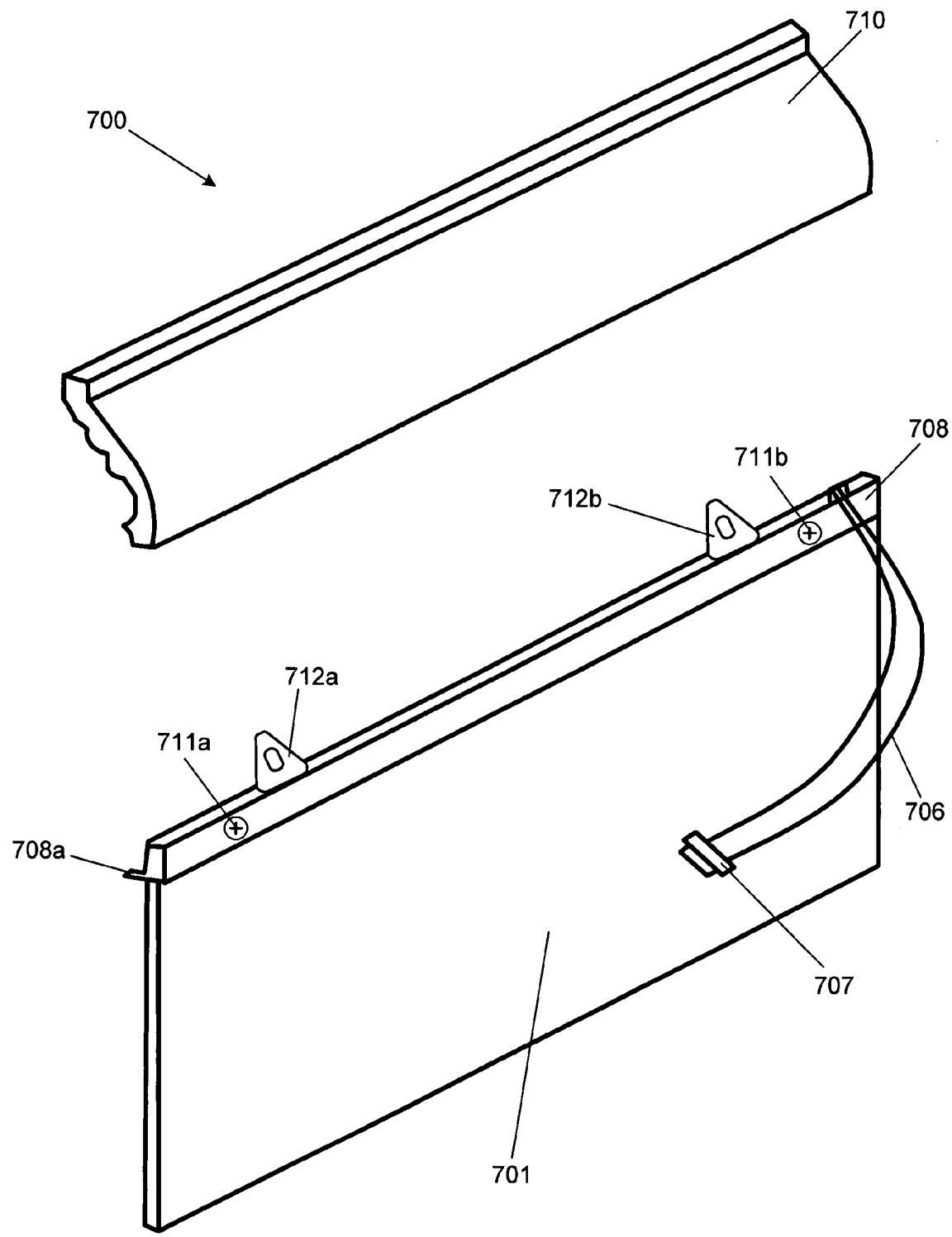
FIG. 7 is a perspective view of a light-emitting diode panel fixture having mounting brackets according to an embodiment of the invention.

FIG. 7 is a perspective view of a light-emitting diode panel fixture having mounting brackets according to an embodiment of the invention. As shown in FIG. 7, a light-emitting diode panel fixture 700 includes a panel assembly 701, a base 108 (shown in FIG. 1b) housing an LED strip (not shown) attached to connector 707 by wiring 706 and a separate decorative trim 710. Attachment mechanisms 711a and 711b, such as screws, attach the base 708 to the panel assembly 701.

The base 708 is made of a heat conductive material, such as a metal, to conduct heat generated by the light-emitting diodes (not shown) within the base 708. As shown in FIG. 7, a lip 708a protrudes from the base 708 above and out away from the panel assembly 701. The lip 708a aids in dissipating heat away from the light-emitting diodes. The base 708 also includes brackets 712a and 712b attached to the base 708. The brackets 712a and 712b are for mounting the base 708 along with the panel assembly 701 to one of a ceiling and a wall. After the base 708 along with the panel assembly 701 is mounted to one of a ceiling and a wall, the separate decorative trim 710 can be attached in a typical manner to the one of a ceiling and a wall so as to at least partially cover the base 708. In the alternative, the separate decorative trim 710 is adhesively attached to the base 708 after the base 708 along with the panel assembly 701 is mounted to one of a ceiling and a wall. In yet another alternative embodiment, the separate decorative trim 710 is adhesively attached to the base 708 and to one of a ceiling and a wall after the base 708 along with the panel assembly 701 is mounted to the one of a ceiling and a wall.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A light-emitting diode panel fixture, comprising:
a light guide panel;
a light-emitting diode strip at an edge of the light guide panel;
a front diffusion cover on the light guide panel;
a base encompassing the light-emitting diode strip and top edges of both the light guide panel and the front diffusion cover such that the light-emitting diode strip and the top edges are recessed within the base;
wires protruding from the base;
a power converter connected to the wires; and
a trim having the appearance of crown molding attached to the base for covering the wiring and the power converter.

2. The light-emitting diode panel fixture of claim 1, further comprising a back mirror on the light guide panel.

3. The light-emitting diode panel fixture of claim 2, wherein the back mirror has a top edge within the base.

4. The light-emitting diode panel fixture of claim 1, wherein the front diffusion cover overhangs a side of the light guide panel.

5. The light-emitting diode panel fixture of claim 1, wherein the front diffusion cover is offset from the light guide panel so as to expose a portion of the light guide panel along a side of the light guide panel.

6. A light-emitting diode panel fixture, comprising:
a light guide panel;
a light-emitting diode strip at an edge of the light guide panel;
a front diffusion cover on the light guide panel;

a base encompassing the light-emitting diode strip and attached to the light guide panel such that a top edge of the light guide panel is within the base;
a back mirror on the light guide panel;
wires protruding from the base;
a trim attached to the base for covering the wiring; and
wherein the front diffusion cover is offset from the light guide panel so as to expose a portion of the light guide panel at a first side of the light guide panel and overhangs a second side of the light guide panel opposite to the first side.

7. The light-emitting diode panel fixture of claim 6, wherein the base has internal surfaces reflecting light from the light-emitting diode strip toward the light guide panel.

8. The light-emitting diode panel fixture of claim 6, wherein the back mirror has a top edge within the base.

9. A light-emitting diode panel fixture, comprising:
a light guide panel;
a light-emitting diode strip at an edge of the light guide panel;
a front diffusion cover on the light guide panel;
a base encompassing the light-emitting diode strip such that the light-emitting diode strip is recessed within the base and attached to the light guide panel, wherein the base is a heat conductive material and has internal surfaces reflecting light from the light-emitting diode strip toward the light guide panel;
a lip protruding from the base above and out away from the light guide panel along an edge of the base adjacent to the front diffusion cover to dissipate heat away from the light-emitting diode strip;
wires protruding from the base; and
a trim attached to the base along the lip for covering the wiring.

10. The light-emitting diode panel fixture of claim 9, wherein the front diffusion cover is on a first surface of the light guide panel and a back mirror is on a second surface of the light guide panel opposite to the first surface.

11. The light-emitting diode panel fixture of claim 10, wherein the front diffusion cover overhangs a first side of the light guide panel.

12. The light-emitting diode panel fixture of claim 11, wherein the front diffusion cover is offset from the light guide panel so as to expose a portion of the light guide panel along a second side of the light guide panel opposite to the first side of the light guide panel.

13. The light-emitting diode panel fixture of claim 10, wherein the front diffusion cover is offset from the light guide panel so as to expose a portion of the light guide panel along a side of the light guide panel.

* * * * *